US011937343B2

(12) United States Patent
Weigensberg et al.

(10) Patent No.: US 11,937,343 B2
(45) Date of Patent: Mar. 19, 2024

(54) METHOD OF MAKING NON-NICOTINE E-VAPING SECTION WITH CHANNEL AND AIR PASSAGE

(71) Applicant: Altria Client Services LLC, Richmond, VA (US)

(72) Inventors: Isaac Weigensberg, Tekoa (IL); Greg Kunin, Rehovot (IL); David Rubli, Revava (IL); Bernard G. Juster, Netanya (IL)

(73) Assignee: Altria Client Services LLC, Richmond, VA (US)

(*) Notice: Subject to any disclaimer, the term of this patent is extended or adjusted under 35 U.S.C. 154(b) by 0 days.

(21) Appl. No.: 17/878,385

(22) Filed: Aug. 1, 2022

(65) Prior Publication Data

US 2022/0369424 A1 Nov. 17, 2022

Related U.S. Application Data

(62) Division of application No. 16/540,433, filed on Aug. 14, 2019, now Pat. No. 11,405,983.

(51) Int. Cl.
*H05B 3/03* (2006.01)
*H05B 1/02* (2006.01)

(52) U.S. Cl.
CPC ............. *H05B 3/03* (2013.01); *H05B 1/0297* (2013.01)

(58) Field of Classification Search
CPC ....... H05B 1/0297; H05B 3/03; A24F 40/485; A24F 40/42; A24F 40/10
See application file for complete search history.

(56) References Cited

U.S. PATENT DOCUMENTS

| | | | |
|---|---|---|---|
| 5,452,711 | A | 9/1995 | Gault |
| 5,649,554 | A | 7/1997 | Sprinkel et al. |
| 8,881,737 | B2 | 11/2014 | Collett et al. |
| 8,997,754 | B2 | 4/2015 | Tucker et al. |

(Continued)

FOREIGN PATENT DOCUMENTS

| | | | |
|---|---|---|---|
| CN | 104287098 | A | 1/2015 |
| CN | 106136327 | A | 11/2016 |

(Continued)

OTHER PUBLICATIONS

Office Action dated Oct. 6, 2022, issued in corresponding U.S. Appl. No. 16/540,378.

(Continued)

*Primary Examiner* — Thien S Tran
(74) *Attorney, Agent, or Firm* — Harness, Dickey & Pierce, P.L.C.

(57) ABSTRACT

The method includes first defining a reservoir in a housing, the reservoir configured to contain a non-nicotine pre-vapor formulation, the non-nicotine pre-vapor formulation being devoid of nicotine and including at least one non-nicotine compound, positioning a heater and a wick in a chamber, the heater being in heating proximity to the wick, second defining at least one first channel, the at least one first channel being configured to communicate the non-nicotine pre-vapor formulation from the reservoir to the wick, and third defining at least one first air passage, the at least one first air passage being configured to allow air to enter the reservoir.

25 Claims, 8 Drawing Sheets

(56) References Cited

U.S. PATENT DOCUMENTS

| | | | | |
|---|---|---|---|---|
| 9,078,473 | B2 | 7/2015 | Worm et al. | |
| 9,420,829 | B2 | 8/2016 | Thorens et al. | |
| 9,549,573 | B2 | 1/2017 | Monsees et al. | |
| 9,888,725 | B2 | 2/2018 | Cameron et al. | |
| 10,039,320 | B2 | 8/2018 | Cameron et al. | |
| 10,058,128 | B2 | 8/2018 | Cameron et al. | |
| 10,219,545 | B2 | 3/2019 | Dong et al. | |
| 2009/0095311 | A1 | 4/2009 | Han | |
| 2014/0224245 | A1 | 8/2014 | Alelov | |
| 2014/0224268 | A1 | 8/2014 | Ryter | |
| 2015/0122274 | A1 | 5/2015 | Cohen et al. | |
| 2015/0257451 | A1 | 9/2015 | Brannon et al. | |
| 2015/0313275 | A1 | 11/2015 | Anderson et al. | |
| 2016/0044963 | A1 | 2/2016 | Saleem | |
| 2016/0150824 | A1 | 6/2016 | Memari et al. | |
| 2016/0150828 | A1 | 6/2016 | Goldstein et al. | |
| 2016/0255876 | A1 | 9/2016 | Rostami | |
| 2016/0286865 | A1* | 10/2016 | King | H02J 50/10 |
| 2017/0173278 | A1 | 6/2017 | Buchberger | |
| 2017/0238596 | A1 | 8/2017 | Matsumoto et al. | |
| 2017/0280768 | A1 | 10/2017 | Lipowicz | |
| 2017/0295848 | A1 | 10/2017 | LaMothe | |
| 2017/0325505 | A1* | 11/2017 | Force | A24F 40/40 |
| 2017/0354184 | A1* | 12/2017 | Mironov | A24F 40/48 |
| 2018/0077967 | A1* | 3/2018 | Hatton | A61M 11/042 |
| 2018/0242643 | A1 | 8/2018 | Silvesstrini et al. | |
| 2018/0310616 | A1 | 11/2018 | Clemens et al. | |
| 2021/0093005 | A1 | 4/2021 | Potter et al. | |
| 2021/0186097 | A1 | 6/2021 | Schmidt et al. | |
| 2022/0071289 | A1 | 3/2022 | Lord et al. | |

FOREIGN PATENT DOCUMENTS

| | | | |
|---|---|---|---|
| CN | 109259313 | A | 1/2019 |
| RU | 2588456 | C2 | 6/2016 |
| WO | WO-2011/0146174 | A2 | 11/2011 |
| WO | WO-2016/096780 | A1 | 6/2016 |
| WO | WO-2019/072915 | A1 | 4/2019 |

OTHER PUBLICATIONS

Office Action dated Mar. 1, 2023, issued in corresponding U.S. Appl. No. 16/540,378.

Juul, "Juul plans to release lower-nicotine vape juice starting in August", Jul. 12, 2018.

Vaping360, "Best Pod Vapes & Mini Vapes 2018", Jul. 20, 2018.

Blu, "Blu® Disposable", downloaded Oct. 12, 2018.

MIGVapor, "Neo Sub-Ohm Vape Mod Kit", downloaded Oct. 12, 2018.

MIGVapor, "TRAP POD Salt Nic EJuice Vape Pod System Juul Kit Alternative", downloaded Oct. 12, 2018.

Invitation to Pay Additional Fees dated Nov. 12, 2020, issued in corresponding International Patent Application No. PCT/US2020/044145.

Invitation to Pay Additional Fees dated Nov. 23, 2020, issued in corresponding International Patent Application No. PCT/US2020/072795.

International Search Report and Written Opinion dated Jan. 21, 2021, issued in corresponding International Application No. PCT/US2020/044145.

International Search Report and Written Opinion dated Feb. 26, 2021, issued in corresponding International Application No. PCT/EP2020/072795.

Written Opinion dated Jul. 12, 2021, issued in corresponding International Application No. PCT/EP2020/072795.

International Preliminary Report on Patentability dated Nov. 23, 2021, issued in corresponding International Application No. PCT/EP2020/072795.

Office Action dated Feb. 18, 2022, issued in corresponding U.S. Appl. No. 16/540,378.

International Preliminary Report on Patentability dated Feb. 24, 2022, issued in corresponding International Application No. PCT/US2020/044145.

Office Action dated Jun. 1, 2022, issued in corresponding U.S. Appl. No. 16/540,378.

Office Action dated Sep. 7, 2023, issued in corresponding U.S. Appl. No. 16/540,378.

Russian Decision to Grant dated Nov. 16, 2023 for corresponding Russian Patent Application 2022102654 and its English-language translation.

Russian Search Report dated Nov. 16, 2023 for corresponding Russian Patent Application 2022102654 and its English-language translation.

Final Office Action, dated Jan. 22, 2024, issued in U.S. Appl. No. 16/540,378.

* cited by examiner

METHOD OF MAKING NON-NICOTINE E-VAPING SECTION WITH CHANNEL AND AIR PASSAGE

CROSS-REFERENCE TO RELATED APPLICATION

This application is a divisional of U.S. application Ser. No. 16/540,433, filed Aug. 14, 2019, the entire contents of which is incorporated herein by reference.

BACKGROUND

Field

Example embodiments generally relate to a non-nicotine electronic vaping (e-vaping) section, and a non-nicotine e-vaping device including the non-nicotine e-vaping section.

Related Art

A non-nicotine e-vaping device uses a heater to at least partially volatilize a non-nicotine pre-vapor formulation to produce a non-nicotine vapor.

SUMMARY

At least one example embodiment is directed toward a non-nicotine e-vaping section.

In one example embodiment, the non-nicotine e-vaping section include a housing; a wick in a chamber defined within the housing; a heater in heating proximity to the wick; and a reservoir configured to contain a non-nicotine pre-vapor formulation, the non-nicotine pre-vapor formulation being devoid of nicotine and including at least one non-nicotine compound, the non-nicotine e-vaping section defining at least one first channel, the at least one first channel being configured to communicate the non-nicotine pre-vapor formulation from the reservoir to the wick, and the non-nicotine e-vaping section further defining at least one first air passage, the at least one first air passage being configured to allow air to enter the reservoir.

In one example embodiment, a total cross-sectional flow area of the at least one first channel is larger than a total cross-sectional flow area of the at least one first air passage.

In one example embodiment, a total cross-sectional flow area of the at least one first channel is about 0.75 $mm^2$ to 1.25 $mm^2$ and a total cross-sectional flow area of the at least one first air passage is about 0.1 $mm^2$ to 0.2 $mm^2$.

In one example embodiment, a ratio of a total cross-sectional flow area of the at least one first channel to a total cross-sectional flow area of the at least one first air passage is between about 9:1 and 5:1.

In one example embodiment, a cross-sectional flow area of each one of the at least one first air passage is no larger than about 0.12 $mm^2$.

In one example embodiment, the wick does not extend into the reservoir and the wick does not extend into the at least one first channel.

In one example embodiment, the at least one first channel includes two or more channels.

In one example embodiment, at least one first air vent is defined within the non-nicotine e-vaping section, the at least one first air vent being configured to allow an airflow to enter the chamber.

In one example embodiment, a discharge end of the at least one first air vent is positioned to directly face the heater.

In one example embodiment, the at least one first air vent is configured to allow the airflow to enter the chamber in a first direction, and the chamber is configured to cause the airflow to flow at least partially across and away from the heater in a second direction, the first direction and the second direction being about perpendicular to each other.

In one example embodiment, the heater includes at least one first flat heating surface, and the first direction is about perpendicular to the at least one first flat heating surface.

In one example embodiment, at least one first air inlet is defined by the housing, the at least one first air inlet being in fluid communication with the at least one first air vent if the non-nicotine e-vaping section is connected to a power section to form an non-nicotine e-vaping device.

In one example embodiment, a first wall of the reservoir at least partially defines the at least one first channel and the at least one first air passage, and the wick is connected to an outer surface of the first wall, the wick covering a discharge end of the at least one first channel, the at least one first air passage including an inlet end that is positioned adjacent to the wick.

In one example embodiment, the wick is connected to a wall of the chamber, the heater overlays and directly contacts the wick, and the heater includes at least one first flat heating surface that faces an interior of the chamber, the at least one first flat heating surface including openings that expose surface regions of the wick to the interior of the chamber.

In one example embodiment, the wick is a thin pad.

In one example embodiment, the non-nicotine e-vaping section further includes the non-nicotine pre-vapor formulation in the reservoir, wherein the non-nicotine pre-vapor formulation includes a non-nicotine vapor former, and the at least one non-nicotine compound.

In one example embodiment, the at least one non-nicotine compound is cannabis, at least one cannabis-derived constituent, or both cannabis and the at least one cannabis-derived constituent.

One example embodiment is directed toward a non-nicotine e-vaping device.

In one example embodiment, the non-nicotine e-vaping section includes a non-nicotine e-vaping section, including, a housing, a wick in a chamber defined within the housing, a heater in heating proximity to the wick, and a reservoir configured to contain a non-nicotine pre-vapor formulation, the non-nicotine pre-vapor formulation being devoid of nicotine and including at least one non-nicotine compound, the non-nicotine e-vaping section defining at least one first channel, the at least one first channel being configured to communicate the non-nicotine pre-vapor formulation from the reservoir to the wick, and the non-nicotine e-vaping section further defining at least one first air passage, the at least one first air passage being configured to allow air to enter the reservoir; and a power section configured to connect to the non-nicotine e-vaping section, the power section including, a power source, and control circuitry, the control circuitry being configured to selectively send an electrical current from the power source to the heater.

In one example embodiment, a total cross-sectional flow area of the at least one first channel is larger than a total cross-sectional flow area of the at least one first air passage.

In one example embodiment, a total cross-sectional flow area of the at least one first channel is about 0.75 $mm^2$ to 1.25 $mm^2$ and a total cross-sectional flow area of the at least one first air passage is about 0.1 $mm^2$ to 0.2 $mm^2$.

In one example embodiment, a ratio of a total cross-sectional flow area of the at least one first channel to a total cross-sectional flow area of the at least one first air passage is between about 9:1 and 5:1.

In one example embodiment, a cross-sectional flow area of each one of the at least one first air passage is no larger than about 0.12 $mm^2$.

In one example embodiment, the wick does not extend into the reservoir and the wick does not extend into the at least one first channel.

In one example embodiment, the at least one first channel includes two or more channels.

In one example embodiment, at least one first air vent is defined within the non-nicotine e-vaping section, the at least one first air vent being configured to allow an airflow to enter the chamber, a discharge end of the at least one first air vent being positioned to directly face the heater.

In one example embodiment, the at least one first air vent is configured to allow the airflow to enter the chamber in a first direction, and the chamber is configured to cause the airflow to flow at least partially across and away from the heater in a second direction, the first direction and the second direction being about perpendicular to each other.

In one example embodiment, at least one first air inlet is defined by the housing, the at least one first air inlet being in fluid communication with the at least one first air vent if the non-nicotine e-vaping section is connected to a power section to form an non-nicotine e-vaping device.

In one example embodiment, a first wall of the reservoir at least partially defines the at least one first channel and the at least one first air passage, and the wick is connected to an outer surface of the first wall, the wick covering a discharge end of the at least one first channel, the at least one first air passage including an inlet end that is positioned adjacent to the wick.

In one example embodiment, the wick is connected to a wall of the chamber, the heater overlays and directly contacts the wick, and the heater includes at least one first flat heating surface that faces an interior of the chamber, the at least one first flat heating surface including openings that expose surface regions of the wick to the interior of the chamber.

In one example embodiment, the wick is a thin pad.

In one example embodiment, the non-nicotine e-vaping device further includes a first pair of electrical connections on a first end of the non-nicotine e-vaping section; and a second pair of electrical connections on a second end of the power section, the first pair of electrical connections being mateable with the second pair of electrical connections to electrically connect the power source to the heater.

In one example embodiment, the non-nicotine e-vaping device further includes at least one first sensor in the power section, the power section being in fluid communication with the chamber, the at least one first sensor being configured to measure at least one of a pressure drop, an airflow direction or both the pressure drop and the airflow direction; and circuitry, the circuitry being operationally connected to the at least one first sensor and the power source, the circuitry being configured to cause the power source to send the electrical current to the heater if the at least one first sensor senses a vaping condition.

In one example embodiment, the non-nicotine e-vaping device further includes the non-nicotine pre-vapor formulation in the reservoir, wherein the non-nicotine pre-vapor formulation includes a non-nicotine vapor former, and the at least one non-nicotine compound.

In one example embodiment, the at least one non-nicotine compound is cannabis, at least one cannabis-derived constituent, or both cannabis and the at least one cannabis-derived constituent.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
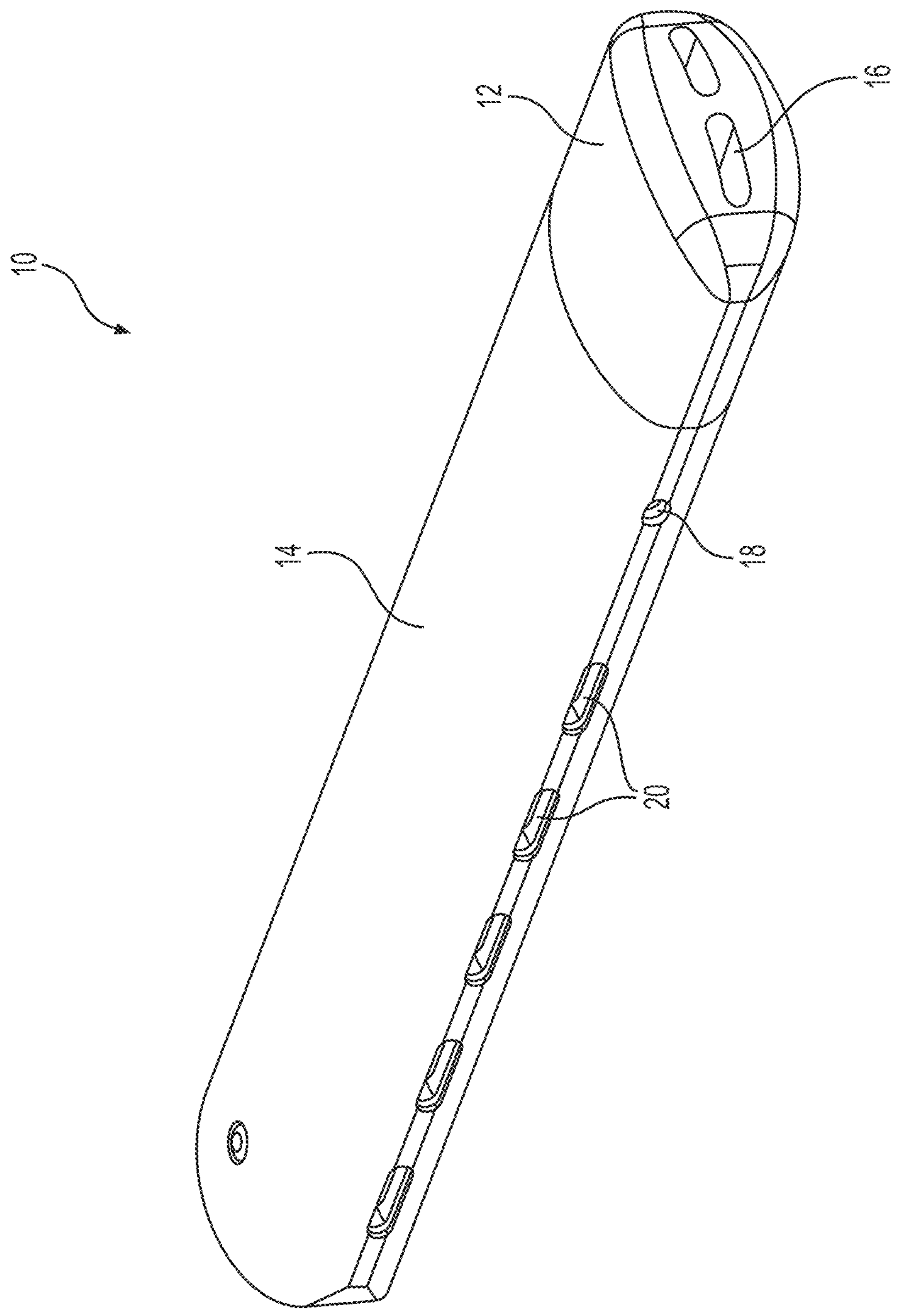
FIG. 1 is an illustration of a perspective view of an non-nicotine e-vaping device, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

When the words "about" and "substantially" are used in this specification in connection with a numerical value, it is intended that the associated numerical value include a tolerance of ±10% around the stated numerical value, unless otherwise explicitly defined.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

FIG. 1 is an illustration of a perspective view of an electronic vaping (e-vaping) device 10, in accordance with an example embodiment. In an example embodiment, the non-nicotine e-vaping device 10 includes two sections: a first non-nicotine e-vaping section, cartridge, or pod 12, and a power section 14. In an example embodiment, the first non-nicotine e-vaping section 12 is connectable to the power section 14. In another example embodiment, the non-nicotine e-vaping device 10 is one singular device that does not include separately connectable sections. In another example embodiment, the non-nicotine e-vaping device 10 includes more than two sections.

In an example embodiment, the first non-nicotine e-vaping section 12 defines one or more outlets 16 on an end of the first non-nicotine e-vaping section 12. In an example embodiment, the power section 14 includes at least one air inlet 18 for the non-nicotine e-vaping device 10. In an example embodiment, the power section 14 includes one or more indicator lights 20 that indicate a capacity of the non-nicotine e-vaping device 10, the power section 14 and/or the first non-nicotine e-vaping section 12, where the capacity can include a power level, a non-nicotine pre-vapor formulation level, etc., as described herein in more detail. In an example embodiment, the one or more indicator lights 20 are light-emitting diodes (LEDs). In an example embodiment, the one or more indicator lights 20 are filament lights, incandescent lights, or other suitable types of lights.

Figure 2:
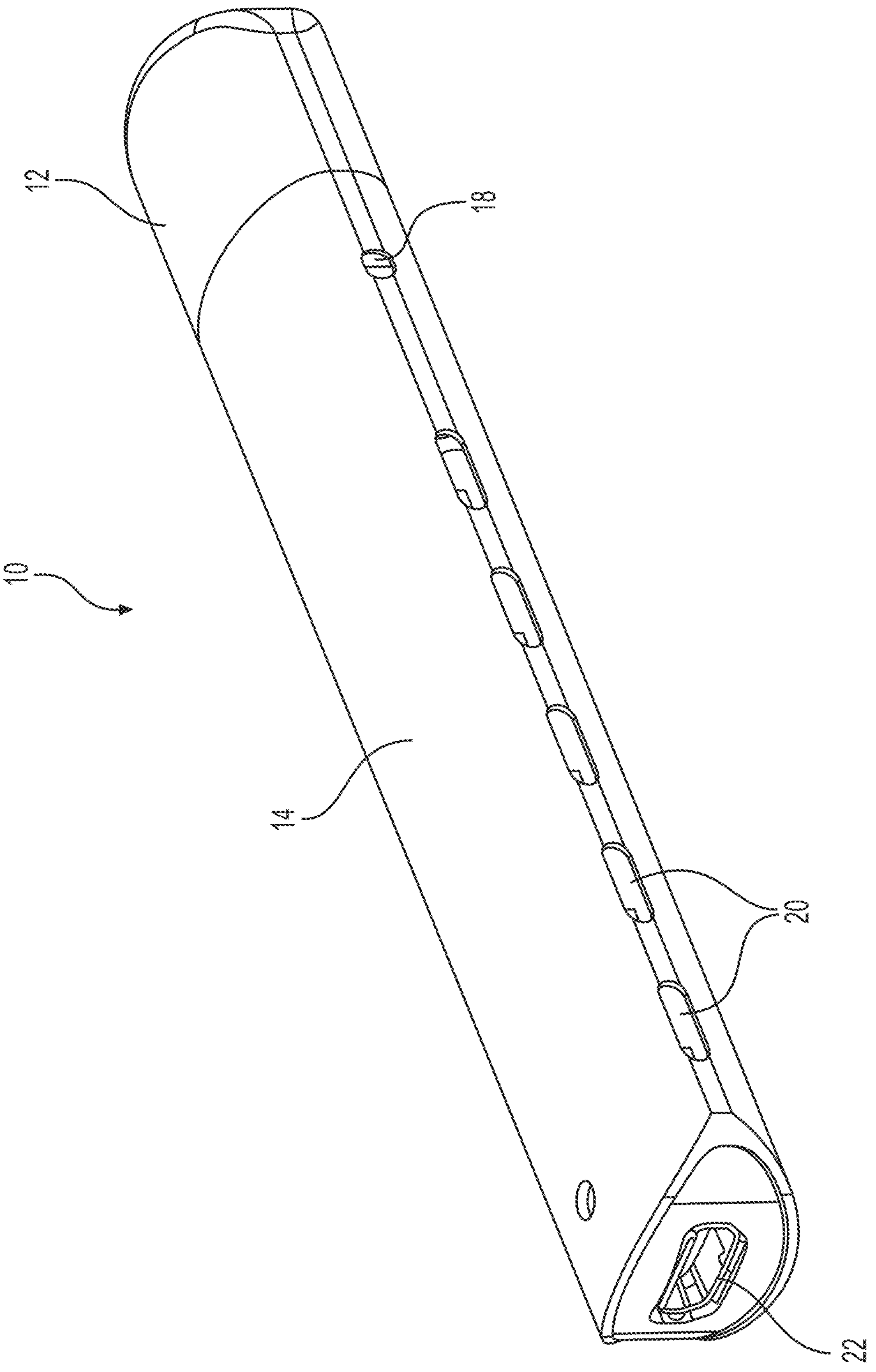
FIG. 2 is an illustration of another perspective view of the non-nicotine e-vaping device, in accordance with an example embodiment.

FIG. 2 is an illustration of another perspective view of the non-nicotine e-vaping device 10, in accordance with an example embodiment. In an example embodiment, the non-nicotine e-vaping device 10 includes a power connector 22. In an example embodiment, the power connector 22 may, for example, be a USB connector, a micro-USB connector, or another connector that connects the non-nicotine e-vaping device 10 to an electric power source.

Example Sections, According to Some Example Embodiments

Figure 3:
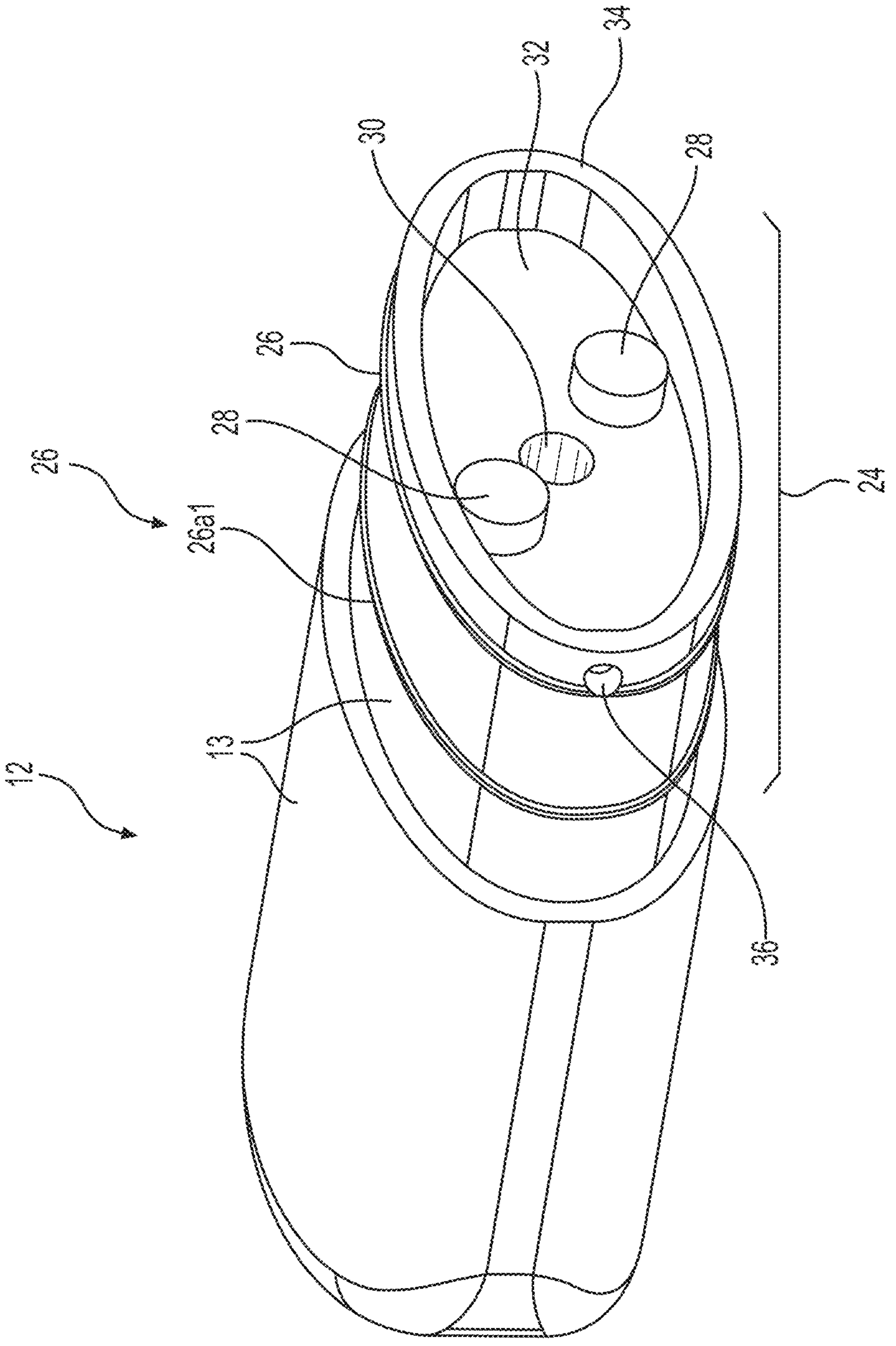
FIG. 3 is an illustration of an end of a first non-nicotine e-vaping section for the non-nicotine e-vaping device, in accordance with an example embodiment.

FIG. 3 is an illustration of an end of the first non-nicotine e-vaping section (pod) 12 for the non-nicotine e-vaping device 10, in accordance with an example embodiment. In an example embodiment, the first non-nicotine e-vaping section 12 includes a first housing 13. In an example embodiment, the first non-nicotine e-vaping section includes a connector 24 that is configured to connect the first non-nicotine e-vaping section 12 to the power section 14. In an example embodiment, the connector 24 includes connecting structure 26 that includes one or more ribs **26*a*1 (as shown in FIG. 3). The one or more ribs 26*a*1 create a friction fit with the power section 14. In an example embodiment, the connecting structure 26 may include tabs, magnets, detents, a latch, a snap fitting, or other suitable structure that cause the connector 24 to connect the first non-nicotine e-vaping section 12 to the power section 14. In an example embodiment, the connector 24 connects the first non-nicotine e-vaping section 12 to the power section 14** via a friction fit.

In an example embodiment, the first housing 13 defines at least one air inlet 36. In an example embodiment, the first housing 13 of the connector 24 defines the at least one air inlet 36 which aligns with the least one air inlet 18 defined by the power section 14 (see at least FIG. 4). In an example embodiment, the first non-nicotine e-vaping section 12 includes a first end surface 32, where a distal end 34 of the first housing 13 extends beyond the first end surface 32. In an example embodiment, the distal end 34 of the first housing 13, that extends beyond the first end surface 32, defines the at least one air inlet 36. In an example embodiment, the at least one air inlet 36 includes one air inlet, two air inlets, or more than two air inlets. In an example embodiment, a size of the at least one air inlet 36 is adjusted to control a desired resistance-to-draw (RTD) for the first non-nicotine e-vaping section 12. In an example embodiment, the first end surface 32 at least partially defines at least one air vent 30. In an example embodiment, the first non-nicotine e-vaping section 12 includes electrical contacts (electrical connections) 28. In an example embodiment, the electrical contacts 28 are on the first end surface 32.

Figure 4:
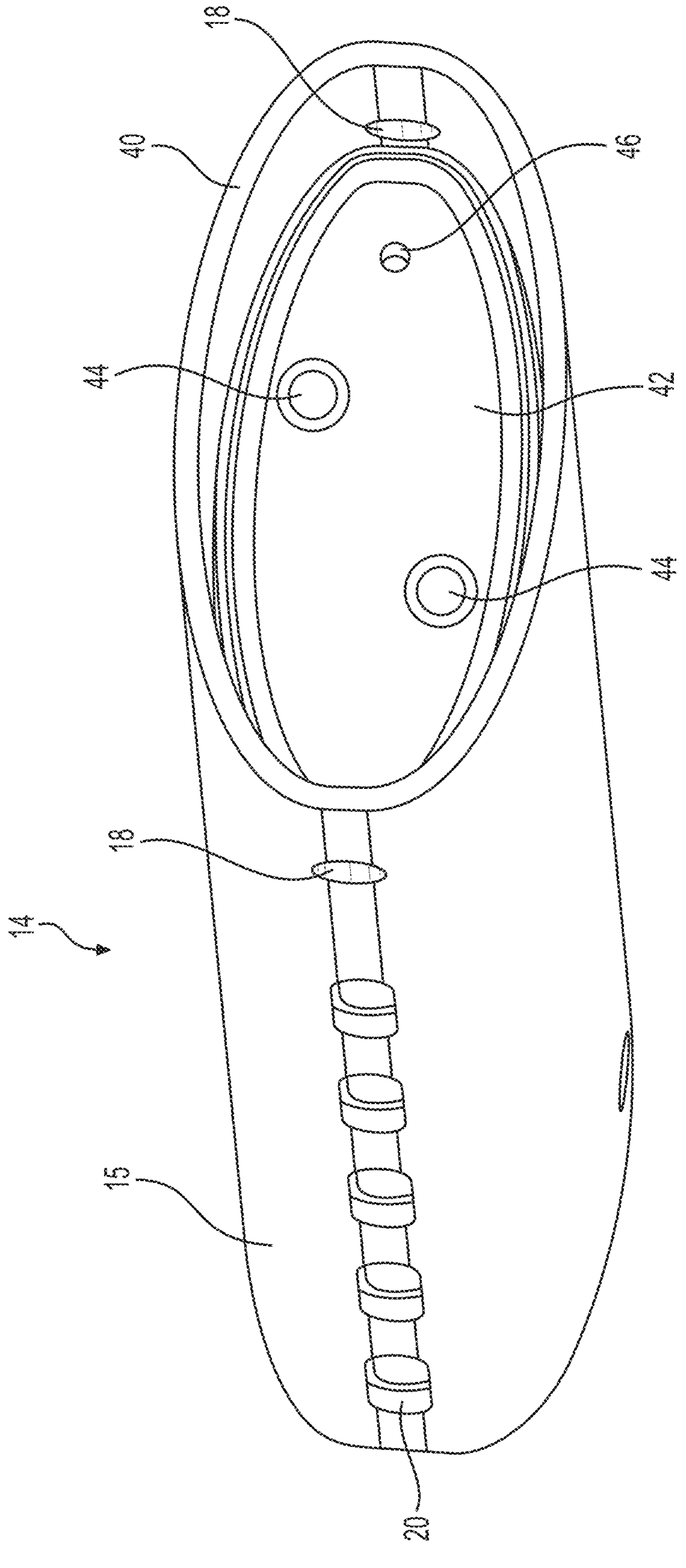
FIG. 4 is an illustration of a perspective view of a power section for the non-nicotine e-vaping device, in accordance with an example embodiment.

FIG. 4 is an illustration of a perspective view of the power section 14 for the non-nicotine e-vaping device 10, in accordance with an example embodiment. In an example embodiment, the power section includes a housing 15. In an example embodiment, a distal end 40 of the housing 15 extends beyond a third end surface 42 of the power section 14. In an example embodiment, the distal end 40 of the housing 15, that extends beyond the third end surface 42 of the power section 14, defines the at least one air inlet 18. In an example embodiment, the at least one air inlet 18 includes a pair of air inlets.

In an example embodiment, the power section 14 includes electrical contacts (electrical connections) 44 that are able to mate with the electrical contacts 28 of the first non-nicotine e-vaping section 12, once the first non-nicotine e-vaping section 12 is connected to the power section 14. In an example embodiment, the power section 14 includes at least one hole 46 defined by the third end surface 42.

Figure 5:
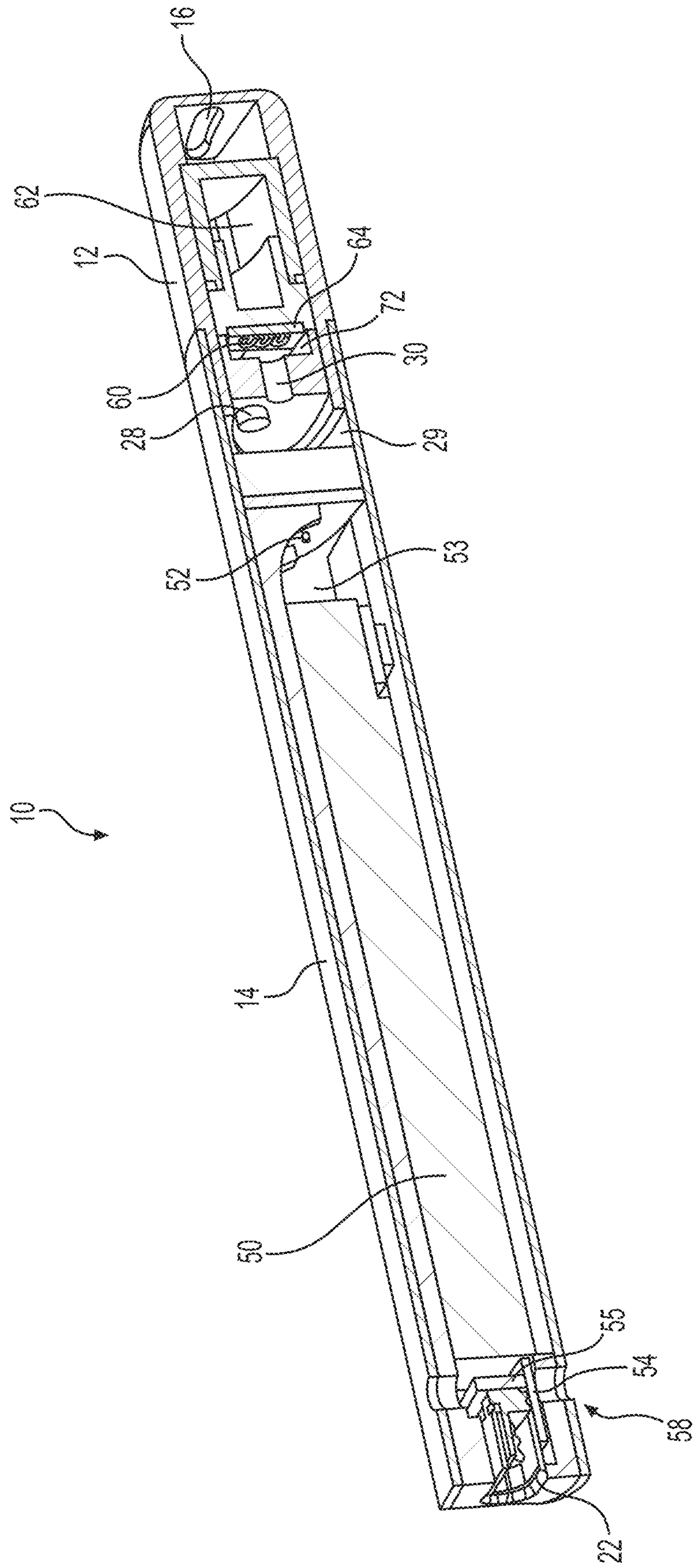
FIG. 5 is an illustration of a cut-away view of the non-nicotine e-vaping device, in accordance with an example embodiment.

FIG. 5 is an illustration of a cut-away view of the non-nicotine e-vaping device 10, in accordance with an example embodiment. In an example embodiment, the first non-nicotine e-vaping section 12 includes a reservoir 62 configured to contain a non-nicotine pre-vapor formulation 21 (see FIG. 6). In an example embodiment, and as explained in more detail herein, a wick 64 is configured to absorb the non-nicotine pre-vapor formulation 21 and transport the non-nicotine pre-vapor formulation 21 from the reservoir 62 to a heater 60. The heater 60 at least partially vaporizes the non-nicotine pre-vapor formulation 21 to form a non-nicotine vapor within a chamber 72. A non-nicotine vapor, a non-nicotine aerosol and a non-nicotine dispersion are used interchangeably and refer to the matter generated or output by the devices and/or elements of the devices disclosed, claimed and/or equivalents thereof, that is devoid of nicotine. In an embodiment, the non-nicotine vapor in the chamber 72 is drawn from the chamber 72 via an airflow that passes through the at least one air vent 30, through the chamber 72, and out the one or more outlets 16, as described herein in more detail (see fluid flow discussion in FIG. 6).

In an example embodiment, when the first non-nicotine e-vaping section 12 is connected to the power section 14, an interior space 29 is defined between the first non-nicotine e-vaping section 12 and the power section 14. Specifically, the interior space 29 is at least partially defined by the first end surface 32 of the first non-nicotine e-vaping section 12 (see FIG. 3), the third end surface 42 of the power section 14 (see FIG. 4) and the distal ends 34/40 of the respective first non-nicotine e-vaping section 12 and power section 14. In an example embodiment, ambient air from outside of the non-nicotine e-vaping device 10 enters the interior space 29 through the at least one air inlet 18 in the power section 14 and the at least one air inlet 36 in the first non-nicotine e-vaping section 12. In an example embodiment, the at least one air inlet 18 and the at least one air inlet 36 are at least partially aligned once the first non-nicotine e-vaping section 12 is connected to the power section 14. In an example embodiment, the interior space 29 is in fluid communication with the at least one air vent 30 and the chamber 72, and in fluid communication with the interior 53 of the power section 14 via the at least one hole 46.

In an example embodiment, the power section 14 includes a power source 50. The power source 50 may include a battery. In an example embodiment, the battery is a Lithium-ion battery or one of its variants, for example a Lithium-ion polymer battery. In an example embodiment, the battery is a Nickel-metal hydride battery, a Nickel cadmium battery, a Lithium-manganese battery, a Lithium-cobalt battery, a fuel cell or a solar cell. Any other power sources or battery technology may be used.

In an example embodiment, the power section 14 includes a control system 58. In an example embodiment, the control system 58 includes a controller 54 that is operationally connected to the power source 50 and at least one sensor 52. In an example embodiment, the controller 54 of the control system 58 performs calculations and controls an operation of elements of the non-nicotine e-vaping device 10, as described herein. In an example embodiment, the control system 58 includes control circuitry 55 that allows the power source 50 to be recharged. In an example embodiment, the at least one sensor 52 includes a pressure sensor and/or a temperature sensor. The at least one sensor 52 can be located in the power section 14 and/or the first non-nicotine e-vaping section 12. In an example embodiment, the at least one sensor 52 is located in an interior 53 of the power section 14. In an example embodiment, the at least one hole 46 (FIG. 4) causes the interior space 29 to be in fluid communication with the interior 53 of the power section 14. In an example embodiment, the at least one sensor 52 is operationally constructed to measure one or more of the following: a resistance of the heater 60, a temperature of the heater 60 and/or a draw of airflow through the non-nicotine e-vaping device 10. In an example embodiment, the control system 58 receives an input signal, or signals, from the at least one sensor 52, and the control system 58 controls operations of the non-nicotine e-vaping device 10, including supplying an electrical current from the power source 50 to the heater 60 to vaporize the non-nicotine pre-vapor formulation 21 based at least in part on the signal(s) from the at least one sensor 52. In an example embodiment, the control system 58 selectively causes the power source 50 to send an electrical current from the power source 50 to the one or more indicator lights 20. In an example embodiment, the control system 58 is operationally and electrically connected to the heater 60 via the electrical contacts 28/44 that allow the control system 58 to selectively send the electrical current to the heater 60. In an example embodiment, the control system 58 is operationally and electrically connected to the power connector 22 to control a charging regimen of the power source 50.

In an example embodiment, an airflow through the non-nicotine e-vaping device 10 activates the non-nicotine e-vaping device 10. The at least one sensor 52 may be configured to generate an output indicative of an airflow, a magnitude of an airflow, and/or a direction of an airflow, where the control system 58 may receive output from the at least one sensor 52 and determine if the following internal conditions exist: (1) a direction of the airflow indicates a draw of airflow through the non-nicotine e-vaping device 10 (versus blowing air through the non-nicotine e-vaping device 10), and/or (2) a magnitude of the airflow exceeds a threshold value. In some example embodiments, only one condition may be sufficient to activate the heater 60, while in other examples, two conditions or all conditions may have to be met before activating the heater 60. If these internal conditions of the non-nicotine e-vaping device 10 are met, the control system 58 electrically connects the power source 50 to the heater 60, thereby activating the heater 60. In an example embodiment, the at least one sensor 52 generates a variable output signal that is in at least partial correlation with a magnitude of a pressure drop sensed by the at least one sensor 52. In an example embodiment, the control system 58 sends a variable electrical current to the heater 60 based on the variable output signal from the at least one sensor 52. In an example embodiment, the control system 58 allows the heater 60 temperature to be manually selected.

In an example embodiment, the control system 58 calculates a capacity of the non-nicotine e-vaping device 10. In an example embodiment, the control system 58 performs this calculation through at least some input from the at least one sensor 52. In an example embodiment, the control system 58 receives signals from the at least one sensor 52 that are indicative of an airflow traveling through the non-nicotine e-vaping device 10. In an example embodiment, the control system 58 includes one or more lookup tables that include tabulated data or values. Based on the received signal or signals from the at least one sensor 52, and based on the one or more lookup tables, the control system 58 can calculate one or more of: a number of draws through the non-nicotine e-vaping device 10 or through the first non-nicotine e-vaping section 12, a temperature of the heater 60, a resistance of the heater 60, a total and/or a cumulative volume of airflow through the non-nicotine e-vaping device 10 and/or the first non-nicotine e-vaping section 12, a duration of use of the first non-nicotine e-vaping section 12, a depletion of the non-nicotine pre-vapor formulation 21 in the reservoir 62, a remaining capacity of the non-nicotine pre-vapor formulation 21 in the reservoir 62, a dryness of the wick 64, etc. In an example embodiment, the control system 58 calculates a capacity of the power source 50. In an example embodiment, the control system 58 performs this calculation through at least some input from the at least one sensor 52, in conjunction with the data or values from the one or more lookup tables. In an example embodiment, the control system 58 receives signals from the at least one sensor 52 and/or the control circuitry 55 that are indicative of an electrical current level output that is being discharged from the power source 50. In an example embodiment, the control system 58 selectively sends an electrical current from the power source 50 to the one or more indicator lights 20 to visually reflect the result of one or more capacity determinations that is performed by the control system 58.

In an example embodiment, the power section 14 is used until the energy in the power source 50 is depleted and/or lowered below a certain threshold. In an example embodiment, the power source 50 is rechargeable and reusable, and the control circuitry 55 in the control system 58 allows the power source 50 to be charged by an external power source that connects to the power connector 22. In an example embodiment, the power section 14 is rechargeable via solar power, or via an induction charging station. In some example embodiments, the control circuitry 55 of the control system 58, when charged, provides power for a desired (or alternatively, a determined) number of draws, until the energy in power source 50 is depleted, and/or until the energy in power source 50 is lowered below a certain threshold, after which the control circuitry 55 must be re-connected to an external charging device.

In an example embodiment, the first non-nicotine e-vaping section 12 is disposable. In this embodiment, the first non-nicotine e-vaping section 12 may be disposed of following depletion of the non-nicotine pre-vapor formulation 21 in the reservoir 62. In an example embodiment, the first non-nicotine e-vaping section 12 is not disposable. In an example embodiment, the non-nicotine e-vaping device 10 is a single section, where the structure of the power section 14 and the first e-vaping section 12 are included in the single section. In an example embodiment, the non-nicotine e-vaping device 10 includes more than two sections.

Figure 6:
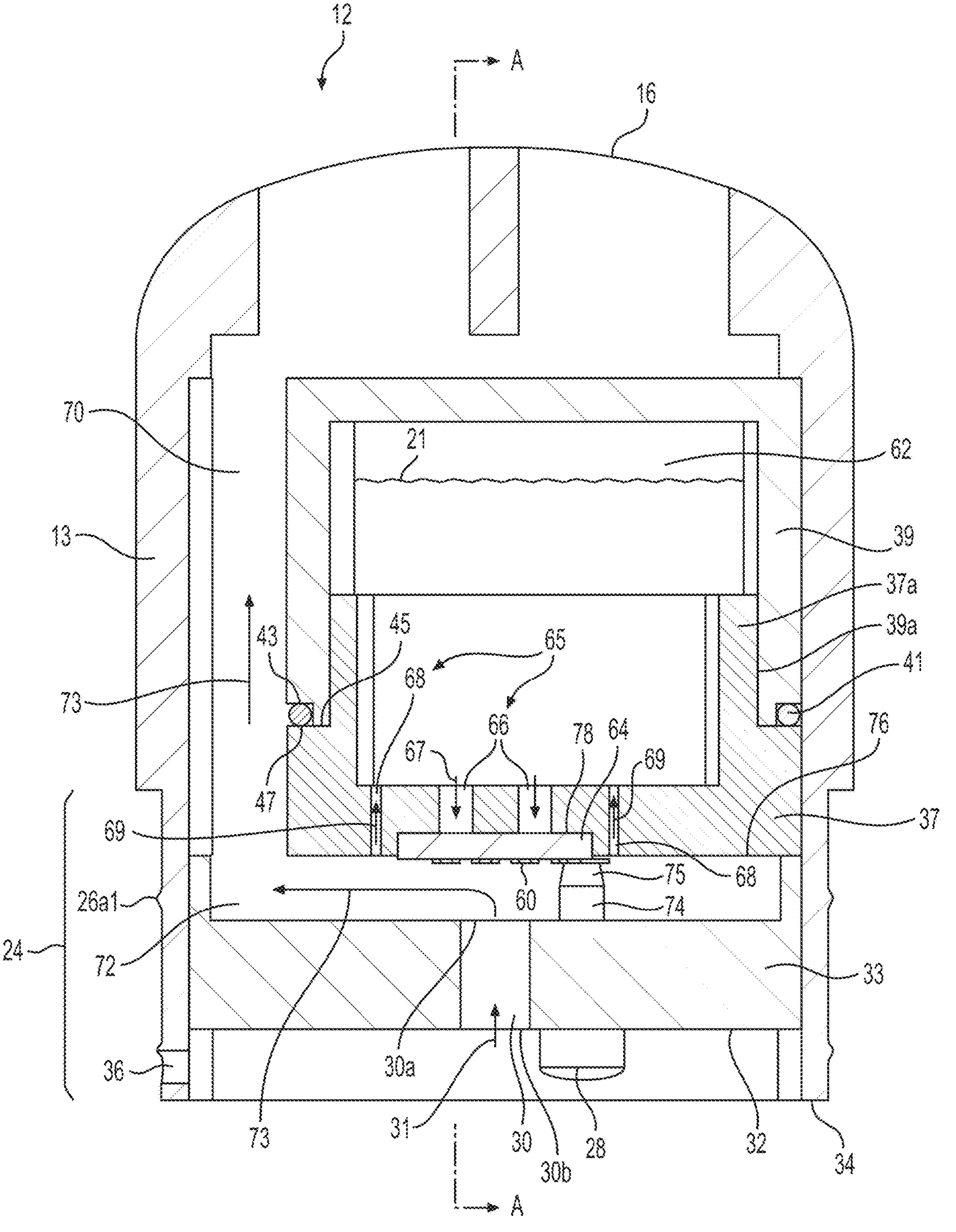
FIG. 6 is an illustration of a cut-away view of the first non-nicotine e-vaping section, in accordance with an example embodiment.

FIG. 6 is an illustration of a cut-away view of the first non-nicotine e-vaping section 12, in accordance with an example embodiment. Previously described reference numbers are, in general, not described here again, for the sake of brevity. In an example embodiment, the first housing 13 and an interior housing 33 enclose internal elements of the first non-nicotine e-vaping section 12. In an example embodiment, the interior housing 33 defines the at least one air vent 30.

In an embodiment, the reservoir 62 is defined by a first reservoir housing (wall) 37 and a second reservoir housing (wall) 39. In an example embodiment, the first reservoir housing 37 includes a distal end portion **37*a* that slides into interior walls 39*a* of the second reservoir housing 39 to join the first reservoir housing 37 with the second reservoir housing 39 via a friction fit connection. In an example embodiment, a distal-most end 45 of the second reservoir housing 39 contacts a ledge 47 of the first housing 13, where a cut-out region 43 holds a gasket 41 to form a liquid-tight seal between the first reservoir housing 37 and the second reservoir housing 39. In an example embodiment, the reservoir 62 is defined by one continuous wall and/or housing, or more than two walls and/or housings. In an example embodiment, a capacity of the reservoir 62 provides enough non-nicotine pre-vapor formulation 21 for the first non-nicotine e-vaping section 12 to produce about 10 to 20 draws, prior to disposal of the first non-nicotine e-vaping section 12. In an example embodiment, a capacity of the reservoir 62 provides enough non-nicotine pre-vapor formulation 21 for the first non-nicotine e-vaping section 12 to produce more than 20 draws, prior to disposal of the first non-nicotine e-vaping section 12**.

In an example embodiment, the first non-nicotine e-vaping section 12 includes channels 65 between the reservoir 62 and the chamber 72. In an example embodiment, the first reservoir housing 37 defines one or more of the channels 65. In an example embodiment, the channels 65 include one or more first channels (first micro-channels) 66 that are defined to exist between the reservoir 62 and the wick 64. In an example embodiment, the one or more first channels 66 include only one channel, or two channels, or more than two channels. In an example embodiment, the one or more first channels 66 allow the wick 64 to transport a flow 67 of the non-nicotine pre-vapor formulation 21 from the reservoir 62 to the wick 64, due at least in part to a capillary force provided by the wick 64. In an example embodiment, the one or more first channels 66 allow the wick 64 to transport the flow 67 of the non-nicotine pre-vapor formulation 21 from the reservoir 62 to the wick 64, due at least in part to a capillary force provided by the small diameter of the one or more first channels 66. In an example embodiment, the flow 67 of the non-nicotine pre-vapor formulation 21 is assisted, at least in part, by an airflow 69 entering the reservoir 62, as described below.

In an example embodiment, the one or more first channels 66 includes at least two channels, to mitigate the possibility that the one or more first channels 66 becomes partially or fully obstructed by a bubble that may hinder or block the flow 67 of the non-nicotine pre-vapor formulation 21 from traveling through the one or more first channels 66. In an example embodiment, the wick 64 does not extend directly into the reservoir 62. In an example embodiment, no capillary structure or wicking system exists between the reservoir 62 and the wick 64, or within the one or more first channels 66, and the lone mode of transport of the non-nicotine pre-vapor formulation 21 from the reservoir 62 to the wick 64 is via communication through the one or more first channels 66.

In an example embodiment, the channels 65 include one or more second channels (air passage) 68. In an example embodiment, the one or more second channels (second micro-channels) 68 include only one channel, or two channels, or more than two channels. In an example embodiment, the one or more second channels 68 are defined between the reservoir 62 and the chamber 72. In an example embodiment, the one or more first channels 68 are positioned to be adjacent to the wick 64. In an example embodiment, the one or more second channels 68 circumvent the wick 64 and/or the heater 60. In an example embodiment, the one or more second channels 68 allow the airflow 69 to travel from the chamber 72 to the reservoir 62, as the non-nicotine pre-vapor formulation 21 is displaced from the reservoir 62. In an example embodiment, the airflow 69 is facilitated and/or assisted by pressure caused in the chamber 72 due to an incoming airflow 31 and a passing flow of non-nicotine vapor 73 within the chamber 72. In an example embodiment, the airflow 69 is facilitated and/or assisted by a displacement (vacuum) force, as the non-nicotine pre-vapor formulation 21 is displaced and depleted from the reservoir 62. In an example embodiment, the one or more second channels 68 are defined between the reservoir 62 and the non-nicotine vapor channel 70, or another portion of the first non-nicotine e-vaping section 12 other than the chamber 72, or ambient air.

In an example embodiment, a first total cross-sectional flow area of the one or more first channels 66 is larger than a second total cross-sectional flow area of the one or more second channels 68. In an example embodiment, a ratio of the first total cross-sectional area of the one or more first channels 66 and the second total cross-sectional area of the of the one or more second channels 68 is between about 10:1 and 4:1, or between about 9:1 and 5:1, or about 7:1. In an example embodiment, the first total cross-sectional flow area of the one or more first channels 66 is between about 0.5 $mm^2$ to 1.5 $mm^2$, or between about 0.75 $mm^2$ to 1.25 $mm^2$, or about 1 $mm^2$. In an example embodiment, the second total cross-sectional flow area of the one or more second channels 68 is between about 0.075 $mm^2$ to 0.225 $mm^2$, or between about 0.1 $mm^2$ to 0.2 $mm^2$, or about 0.15 $mm^2$. In an example embodiment, each of the one or more second channels 68 is small enough that the non-nicotine pre-vapor formulation 21 is not able to travel through the one or more second channels 68. The size of each of the one or more second channels 68 is dependent on factors that include: a smoothness of each of the one or more second channels 68, a material that defines the one or more second channels 68 (the first reservoir housing 37), a surface tension of the non-nicotine pre-vapor formulation 21, etc. In an example embodiment, assuming that the one or more second channels 68 includes two channels, a cross-sectional flow area of each of the channels 68 is no larger than about 0.12 $mm^2$, or no larger than about 0.1 $mm^2$, or no larger than about 0.075 $mm^2$. Other ranges of values for the sizes of the one or more first channels 66 and the one or more second channels 68, and the ratio of the total cross-sectional flow area of the one or more first channels 66 and the one or more second channels 68, are contemplated.

In an example embodiment, the wick 64 is on a wall 76 of the chamber 72. In an example embodiment, the wall 76 is formed at least in part by the first reservoir housing 37. In an example embodiment, the wick 64 is embedded in the wall 76, by an entrenched section 78 of the wall 76. In an example embodiment, the heater 60 is in heating proximity to the wick 64, such that the heater 60 is close enough to the wick 64 to at least partially vaporize the non-nicotine pre-vapor formulation 21 absorbed by the wick 64. That is to say, the heater 60 is close enough to the wick 64 that the heater 60 is able to at least partially vaporize the non-nicotine pre-vapor formulation 21 that is absorbed by the wick 64.

In an example embodiment, the wick 64 is a thin pad. In an example embodiment, the wick 64 is rectangular. In an example embodiment, the wick 64 is square, circular, or another shape. In an example embodiment, the wick 64 is sized to absorb enough of the non-nicotine pre-vapor formulation 21 to produce one draw from the first non-nicotine e-vaping section 12. In an example embodiment, the wick 64 is made of a porous material and/or absorbent material that has a capacity to absorb the non-nicotine pre-vapor formulation 21. In an example embodiment, the wick 64 is made of fibrous materials, filaments, including glass or ceramic filaments. In an example embodiment, the wick 64 does not extend into the reservoir 62. In an example embodiment, the wick 64 does not extend into the one or more first channels 66. In an example embodiment, the wick 64 hold about 5 $mm^3$ to 15 $mm^3$ of the non-nicotine pre-vapor formulation 21, or about 7.5 $mm^3$ to 12.5 $mm^3$, or about 10 $mm^3$. In an example embodiment, the heater 60 and the wick 64 volatilize the non-nicotine pre-vapor formulation 21 in about 0.2 seconds.

In an example embodiment, the heater 60 is in direct contact with the wick 64. In an example embodiment, the heater 60 is on a surface of the wick 64. In an example embodiment, the heater 60 includes a flat surface 80 that spans across at least a portion of a surface of the wick, as described in more detail in FIG. 8. In an example embodiment, the flat surface 80 of the heater 60 faces an interior of the chamber 72. In an example embodiment, the heater 60 is on a first side of the wick 64 that opposes a second side of the wick 64, where the second side of the wick 64 faces the one or more first channels 66.

In an example embodiment, the at least one air vent 30 includes an outlet (discharge end) 30*a* that directs the incoming airflow 31 at the heater 60. In an example embodiment, the outlet 30*a* is in close proximity to the heater 60. In an example embodiment, the outlet 30*a* is a distance of about 1.0 mm to 2.0 mm from the heater 60, or about 1.2 mm to 1.5 mm from the heater 60, or about 1.3 mm from the heater 60. In an example embodiment, the outlet 30*a* faces the heater 60. In an example embodiment, the outlet 30*a* directs the incoming airflow 31 at a center position 71 of the heater 60 (see FIG. 8). In an example embodiment, the flow of non-nicotine vapor 73 in the chamber 72 passes across at least a portion of the heater 60. In an example embodiment, facing the outlet 30*a* at the heater 60 causes turbulent airflow conditions at the heater 60, so that an intimate mixing of the incoming airflow 31 and the non-nicotine vapor from the heater 60 can occur. In an example embodiment, the incoming airflow 31 is also directed at, towards or near the one or more second channels 68, to provide an air pressure to further cause the airflow 69 to travel from the chamber 72 to the reservoir 62. In an example embodiment, the incoming airflow 31 enters the chamber 72 in a first direction, and the chamber 72 causes the incoming airflow 31 to flow across and away from the heater 60 in a second direction, the first direction and the second direction being about perpendicular to each other. In an example embodiment, the first direction is about perpendicular to the flat surface 80 (see FIG. 8) of the heater 60. In an example embodiment, the second direction is about parallel to the flat surface 80 of the heater 60. In an example embodiment, a size of the cross-sectional flow area of the at least one air vent 30 is adjusted to control the desired RTD for the first non-nicotine e-vaping section 12. In an example embodiment, an inlet 30*b* of the at least one air vent 30 is not directly exposed to ambient air during operation of the non-nicotine e-vaping device 10, as ambient air instead first passes through the at least one air inlet 18 and the at least one air inlet 36 prior to reaching the at least one air vent 30.

In an example embodiment, a non-nicotine vapor channel 70 is defined within the first non-nicotine e-vaping section 12. In an example embodiment, the non-nicotine vapor channel is at least partially defined by the first housing 13, the first reservoir housing 37 and the second reservoir housing 39. In an example embodiment, the non-nicotine vapor channel 70 is in fluid communication with the chamber 72 and the one or more outlets 16, and the non-nicotine vapor channel 70 directs the flow of non-nicotine vapor 73 from the chamber 72 to the one or more outlets 16.

In an example embodiment, posts 74 and electrical contacts 75 electrically connect the electrical contacts 28 to the heater 60.

Figure 7:
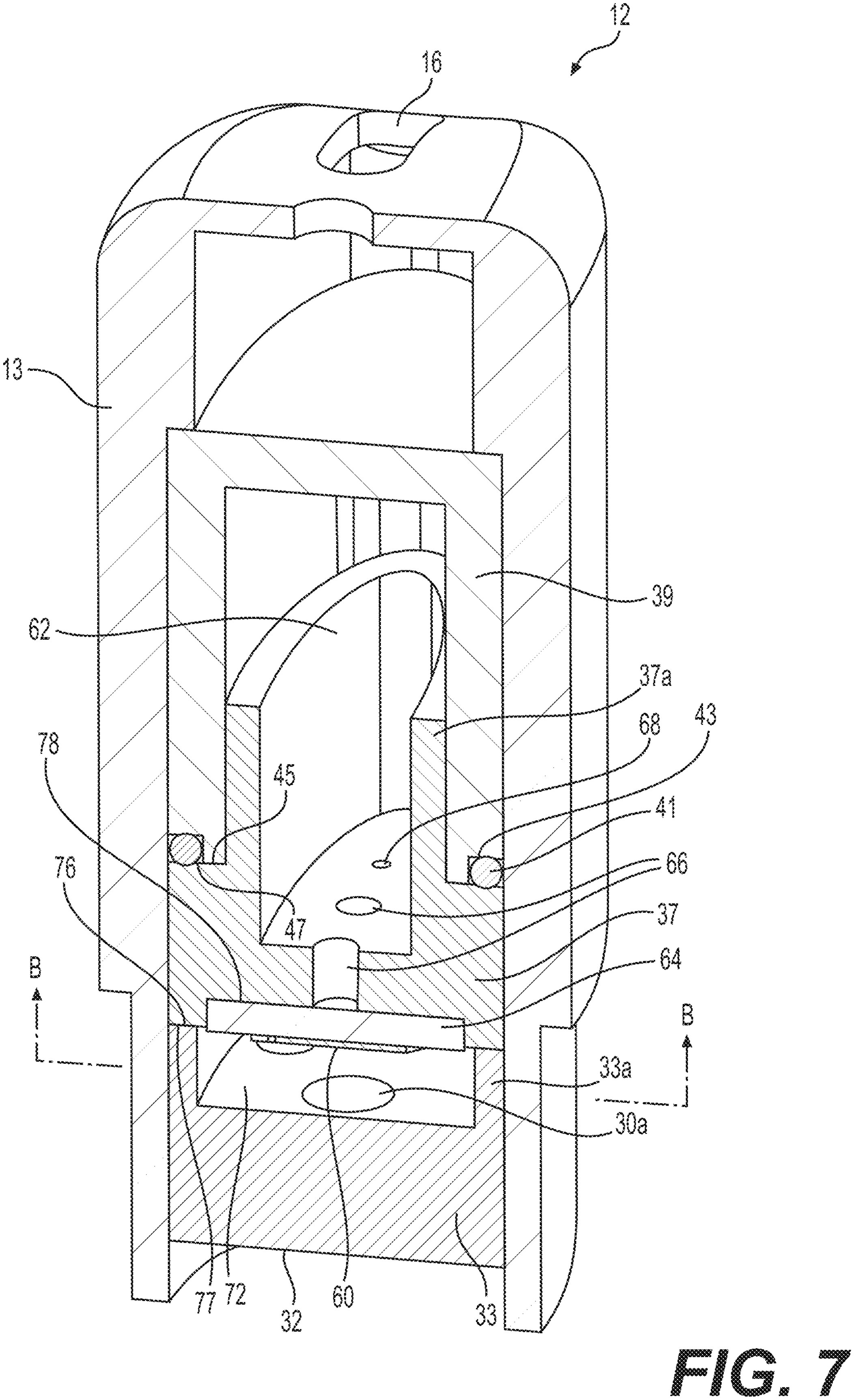
FIG. 7 is an illustration of another cut-away view of the first non-nicotine e-vaping section, in accordance with an example embodiment.

General Fluid Flow Through the First Non-Nicotine Section and Device, according to some Embodiments:

In an example embodiment, airflow enters the non-nicotine e-vaping device 10 through the at least one air inlet 18 (FIG. 4), passes through the at least one air inlet 36, the interior space 29 (FIG. 5), the at least one air vent 30 and into the chamber 72. In the chamber 72, the airflow 31 picks up at least partially volatilized vapor from the heater 60, and the resulting non-nicotine vapor 73 travels from the heater 60 and through the a non-nicotine vapor channel 70 prior to leaving the non-nicotine e-vaping device 10 through the one or more outlets 16. In an example embodiment, while the first non-nicotine e-vaping section 12 is in use, the flow 67 of the non-nicotine pre-vapor formulation travels from the reservoir 62 through the one or more first channels 66 to the wick 64 to become at least partially volatilized by the heater 60, while an airflow 69 enters the reservoir 62 via the one or more second channels 68. FIG. 7 is an illustration of another cut-away view (perspective A-A, of FIG. 6) of the first non-nicotine e-vaping section 12, in accordance with an example embodiment. Previously described reference numbers are, in general, not described here again, for the sake of brevity. In an example embodiment, a distal end portion 33*a* of the interior housing 33 at least partially defines the chamber 72. In an example embodiment, the interior housing 33 fits into the first housing 13, where a first contacting surface 77 of the interior housing 33 contacts the second contacting surface 76 to ensure the interior housing is positioned correctly in the first housing 13. In an example embodiment, the interior housing 33 is held within the first housing 13 via a friction fit.

Figure 8:
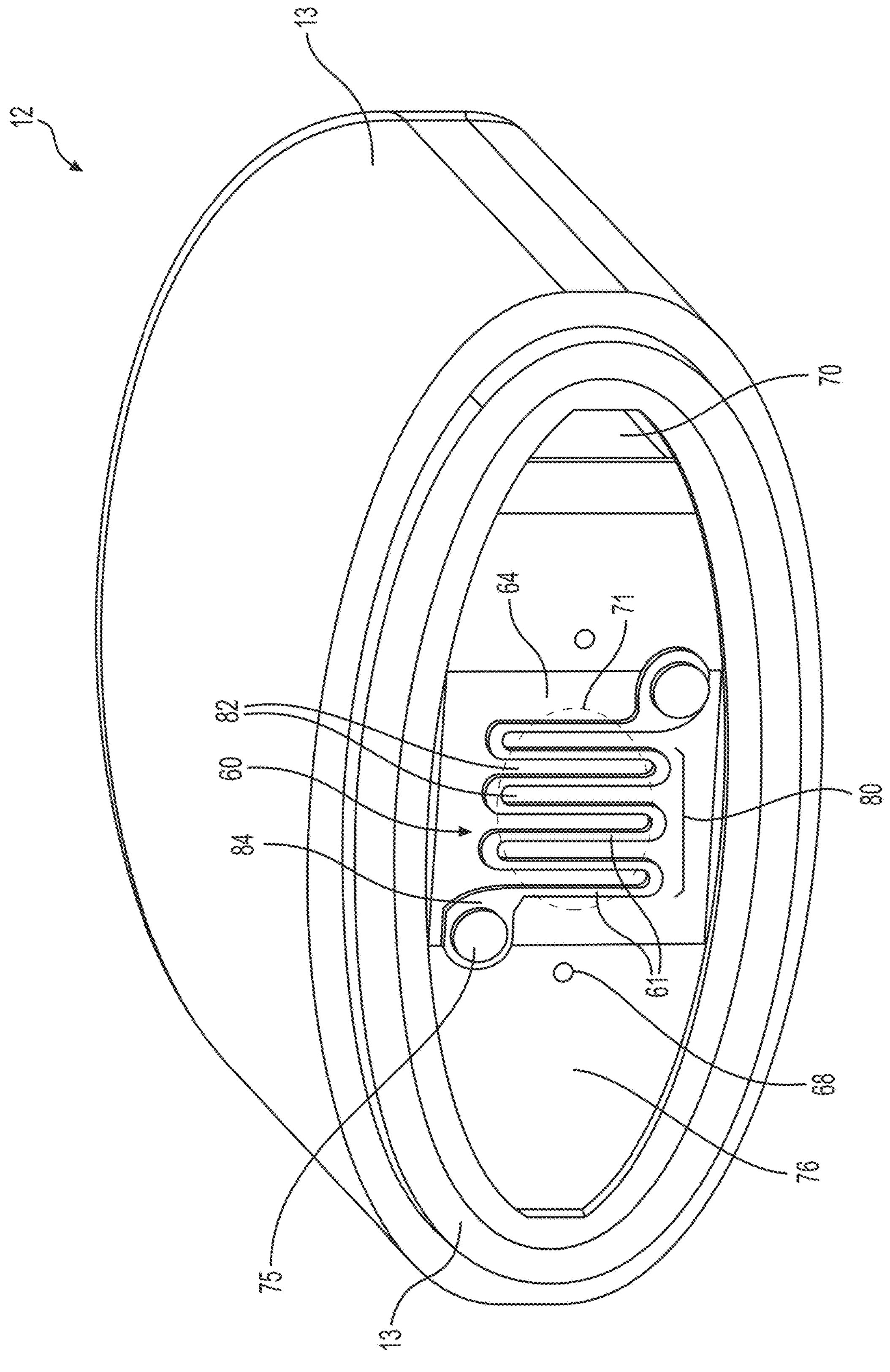
FIG. 8 is an illustration of another cut-away view of the first non-nicotine e-vaping section, in accordance with an example embodiment.

In an example embodiment, the outlet 30*a* faces the heater 60 and wick 64, and the outlet 30*a* is substantially centered on a center position 71 of the heater 60 (as shown in FIG. 8).

In an example embodiment, the distal end portion 37*a* of the first reservoir housing 37 has an oval shaped cross-section, as shown in FIG. 7.

In an example embodiment, the second reservoir housing 39 is adhesively connected to the interior of the first housing 13, and the first reservoir housing 37 is adhesively connected to the second reservoir housing 39, via an application of an adhesive at one or more surface locations where the second reservoir housing 39 and the first housing 13 contact each other, and at one or more surface locations where the first reservoir housing 37 and the second reservoir housing 39 contact each other. In an example embodiment, the interior housing 33 is adhesively connected to the first reservoir housing and/or the first housing 13 using an application of an adhesive at surface contact locations. In an example embodiment, the adhesive (sealant) is a silicon-based adhesive, or another suitable sealant, that provides a liquid and air-tight seal. In an example embodiment, the first reservoir housing 37, the second reservoir housing 39, the interior housing 33 and the first housing 13 are held together via a friction (press) fit, where no adhesive is used to assemble the first e-vaping section 12.

FIG. 8 is an illustration of a cut-away view (perspective B-B, of FIG. 7) of the first non-nicotine e-vaping section 12, in accordance with an example embodiment. This view shows elements along the wall 76 of the chamber 72 in better detail. Previously described reference numbers are, in general, not described here again, for the sake of brevity. In an example embodiment, the heater 60 includes a heating element 61. In an example embodiment, the heating element 61 is a flat metallic structure. In an example embodiment, the heating element 61 is a thin and/or wire structure. In an example embodiment, the heating element 61 is in the shape of a wave (e.g., sinusoidal wave) or an “S” shape. In an example embodiment, the heating element 61 is shaped to maximize a surface contact with the wick 64. In an example embodiment, the heating element defines openings 82 within the heating element 61, where the openings expose surface regions of the wick 64 to the interior of the chamber 72. In an example embodiment, the heater 60, or the heating element 61 of the heater 60, forms a substantially flat surface 80. In an example embodiment, the heater 60 is constructed of an iron-aluminide (e.g., FeAl or $Fe_3Al$). In an embodiment, the heater 60 is in the form of a wire coil, a planar body, a ceramic body, a single wire, a cage of resistive wire, or any other suitable form that is configured to vaporize the non-nicotine pre-vapor formulation 21. In at least one example embodiment, the heater 60 is formed of any suitable electrically resistive material or materials. In an example embodiment, the heater 60 is a ceramic heater having an electrically resistive layer on an outside surface thereof.

In an example embodiment, the center position 71 of the heater 60, which a portion of the heater 60 that the outlet 30*a* faces, includes the flat surface 80. In an example embodiment, the center position 71 of the heater 60 corresponds to a center area of the heater 60 and/or the heating element 61.

In an example embodiment, the heater 60 includes electrical contacts 84. In an example embodiment, the electrical contacts 84 are electrically connected to the power source 50. In an example embodiment, the electrical contacts 84 of the heater 60 are electrically connected to the electrical contacts 75 and the posts 74 of the first non-nicotine e-vaping section 12, where the posts 74 are in turn electrically connected to the electrical contacts 28 of the first non-nicotine e-vaping section 12 and the electrical contacts 44 of the power section 14. In an example embodiment, one of the electrical contacts 44 is electrically connected to the power source 50 and the other electrical contact 44 is connected to the control circuitry 55, so that the control circuitry 55 of the control system 58 can selectively cause the power source 50 to send an electrical current to the electrical contacts 44 of the power section, through the electrical contacts 28 of the first non-nicotine e-vaping section 12, and through the posts 74 and the electrical contacts 75 to energize the heater 60.

In an example embodiment, the one or more second channels 68 are on sides of the wick 64. In an example embodiment, the one or more second channels 68 are not covered by the wick 64, and the one or more first channels 66 are covered by the wick 64.

Advantages of Some of the Example Embodiments:

Advantageous of some of the example embodiments include the following.

A. Gravity independence: Some factors including a relatively small non-nicotine pre-vapor formulation mass, a small size of the one or more first channels 66, and a geometry of elements of the first non-nicotine e-vaping section 12, at least partially assist in causing the non-nicotine e-vaping device 10 to be less dependent, or not dependent, on gravity in order to operate the non-nicotine e-vaping device 10 and communicate the non-nicotine pre-vapor formulation 21 to the wick 64 and heater 60. That is to say, an orientation of the non-nicotine e-vaping device 10 does not impact or change a performance of the non-nicotine e-vaping device 10. These factors at least partially assist in mitigating leakage and ensuring that a desired and uniform amount of the non-nicotine pre-vapor formulation 21 is applied to the wick and vaporized by the heater 60.

B. Reduced power source size: Some factors including a relatively small non-nicotine pre-vapor formulation mass and a geometry of elements of the first non-nicotine e-vaping section 12 allow for a relatively small power source 50. This can assist charging schemes for the non-nicotine e-vaping device 10.

Example Embodiments with Non-Nicotine Pre-Vapor Formulation

In an example embodiment, a flavoring (at least one flavorant) and/or a non-nicotine compound is included in the non-nicotine pre-vapor formulation 21. In an example embodiment, the non-nicotine pre-vapor formulation 21 is a liquid, solid, dispersion and/or a gel formulation including, but not limited to, water, beads, solvents, active ingredients, ethanol, plant extracts, natural or artificial flavors, and/or at least one non-nicotine vapor former such as glycerin and propylene glycol.

The non-nicotine compound is devoid of nicotine. In an example embodiment, the non-nicotine compound does not include tobacco, nor is the compound derived from tobacco. In an example embodiment, the non-nicotine compound is cannabis, or includes at least one cannabis-derived constituent. In an example embodiment, a cannabis-derived constituent includes at least one of a cannabis-derived cannabinoid (e.g., a phytocannabinoid, or a cannabinoid synthesized by a cannabis plant), at least one cannabis-derive terpene, at least one cannabis-derived flavonoid, or combinations thereof.

In an example embodiment, the non-nicotine compound is in the form of, or included in, a solid, a semi-solid, a gel, a hydrogel, or combinations thereof, and the non-nicotine compound is infused into, or co-mingled or combined within, the non-nicotine pre-vapor formulation 21. In an example embodiment, the non-nicotine compound is in the form of, or included in, a liquid or a partial-liquid, that includes an extract, an oil, a tincture, a suspension, a dispersion, a colloid, an alcohol, a general non-neutral (slightly acidic or slightly basic) solution, or combinations thereof, and the non-nicotine compound is infused into, or comingled or combined within, the non-nicotine pre-vapor formulation 21. In an example embodiment, the non-nicotine compound is a constituent of the non-nicotine pre-vapor formulation 21. In an example embodiment, the non-nicotine pre-vapor formulation 21 is, or is part of, a dispersion, a suspension, a gel, a hydrogel, a colloid, or combinations thereof, and the non-nicotine compound is a constituent of the non-nicotine pre-vapor formulation 21.

In an example embodiment, the non-nicotine compound undergoes a slow, natural decarboxylation process over an extended duration of time at low temperatures, including at or below room temperature (72° F.). In an example embodiment, the non-nicotine compound may undergo a significantly elevated decarboxylation process, on the order of 50% decarboxylation or greater if the non-nicotine compound is exposed to elevated temperatures especially in the range of about 175° F. or greater over a period of time (minutes or hours, at a relatively low pressure such as 1 atmosphere), where even further elevated temperatures (about 240° F. or greater) can cause a rapid or instantaneous decarboxylation to occur at a potentially high decarboxylation rate (50% or more), though ever further elevated temperatures can cause a degradation of some or all of the chemical properties of the non-nicotine compounds.

In an example embodiment, the at least one non-nicotine vapor former of the non-nicotine pre-vapor formulation includes diols (such as propylene glycol and/or 1,3-propanediol), glycerin and combinations, or sub-combinations, thereof. Various amounts of non-nicotine vapor former may be used. For example, in some example embodiments, the at least one non-nicotine vapor former is included in an amount ranging from about 20% by weight based on the weight of the non-nicotine pre-vapor formulation 21 to about 90% by weight based on the weight of the non-nicotine pre-vapor formulation 21 (for example, the non-nicotine vapor former is in the range of about 50% to about 80%, or about 55% to 75%, or about 60% to 70%), etc. As another example, in an example embodiment, the non-nicotine pre-vapor formulation 21 includes a weight ratio of the diol to glycerin that ranges from about 1:4 to 4:1, where the diol is propylene glycol, or 1,3-propanediol, or combinations thereof. In an example embodiment, this ratio is about 3:2. Other amounts or ranges may be used.

In an example embodiment, the non-nicotine pre-vapor formulation 21 includes water. Various amounts of water may be used. For example, in some example embodiments, water may be included in an amount ranging from about 5% by weight based on the weight of the non-nicotine pre-vapor formulation 21 to about 40% by weight based on the weight of the non-nicotine pre-vapor formulation 21, or in an amount ranging from about 10% by weight based on the weight of the non-nicotine pre-vapor formulation 21 to about 15% by weight based on the weight of the non-nicotine pre-vapor formulation 21. Other amounts or percentages may be used. For example, in an example embodiment, the remaining portion of the non-nicotine pre-vapor formulation 21 that is not water (and not the non-nicotine compound and/or flavorants), is the non-nicotine vapor former (described above), where the non-nicotine vapor former is between 30% by weight and 70% by weight propylene glycol, and the balance of the non-nicotine vapor former is glycerin. Other amounts or percentages may be used.

In an example embodiment, the non-nicotine pre-vapor formulation 21 includes at least one flavorant in an amount ranging from about 0.2% to about 15% by weight (for instance, the flavorant may be in the range of about 1% to 12%, or about 2% to 10%, or about 5% to 8%). In an example embodiment, the at least one flavorant includes volatile cannabis flavor compounds (flavonoids). In an example embodiment, the at least one flavorant includes flavor compounds instead of, or in addition to, the cannabis flavor compounds. In an example embodiment, the at least one flavorant may be at least one of a natural flavorant, an artificial flavorant, or a combination of a natural flavorant and an artificial flavorant. For instance, the at least one flavorant may include menthol, wintergreen, peppermint, cinnamon, clove, combinations thereof, and/or extracts thereof. In addition, flavorants may be included to provide herb flavors, fruit flavors, nut flavors, liquor flavors, roasted flavors, minty flavors, savory flavors, combinations thereof, and any other desired flavors.

In an example embodiment, the non-nicotine compound may be a medicinal plant, or a naturally occurring constituent of the plant that has a medically-accepted therapeutic effect. The medicinal plant may be a cannabis plant, and the constituent may be at least one cannabis-derived constituent. Cannabinoids (phytocannabinoids) are an example of a cannabis-derived constituent, and cannabinoids interact with receptors in the body to produce a wide range of effects. As a result, cannabinoids have been used for a variety of medicinal purposes. Cannabis-derived materials may include the leaf and/or flower material from one or more species of cannabis plants, or extracts from the one or more species of cannabis plants. In an example embodiment, the one or more species of cannabis plants includes *Cannabis sativa, Cannabis indica*, and *Cannabis ruderalis*. In some example embodiments, the non-nicotine pre-vapor formulation 21 includes a mixture of cannabis and/or cannabis-derived constituents that are, or are derived from, 60-80% (e.g., 70%) *Cannabis sativa* and 20-40% (e.g., 30%) *Cannabis indica*.

Examples of cannabis-derived cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrad ydrocannabinolic acid (THCA) is a precursor of tetrahydrocannabinol (THC), while cannabidiolic acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In an example embodiment, heat from the heater 60 may cause decarboxylation to convert tetrahydrocannabinolic acid (THCA) in the non-nicotine pre-vapor formulation 21 to tetrahydrocannabinol (THC), and/or to convert cannabidiolic acid (CBDA) in the non-nicotine pre-vapor formulation 21 to cannabidiol (CBD).

In instances where both tetrahydrocannabinolic acid (THCA) and tetrahydrocannabinol (THC) are present in the non-nicotine pre-vapor formulation 21, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC), via the decarboxylation process, during the heating of the non-nicotine pre-vapor formulation 21 for purposes of vaporization. Similarly, in instances where both cannabidiolic acid. (CBDA) and cannabidiol (CBD) are present in the non-nicotine pre-vapor formulation 21, the decarboxylation and resulting conversion will cause a decrease in cannabidiolic acid (CBDA) and an increase in cannabidiol (CBD). At least 50% (e.g., at least 87%) of the cannabidiolic acid (CBDA) may be converted to cannabidiol (CBD), via the decarboxylation process, during the heating of the non-nicotine pre-vapor formulation 21 for purposes of vaporization.

The non-nicotine pre-vapor formulation 21 may contain the non-nicotine compound that provides the medically-accepted therapeutic effect (e.g., treatment of pain, nausea, epilepsy, psychiatric disorders). Details on methods of treatment may be found in U.S. application Ser. No. 15/845,501, filed Dec. 18, 2017, titled "VAPORIZING DEVICES AND METHODS FOR DELIVERING A COMPOUND USING THE SAME," the disclosure of which is incorporated herein in its entirety by reference.

In an example embodiment, the portion of the non-nicotine pre-vapor formulation 21 that is not the non-nicotine compound and/or the flavorant, includes 10-15% by weight water, where the remaining portion of the non-nicotine compound and non-flavorant portion of the non-nicotine pre-vapor formulation 21 is a mixture of propylene glycol and a non-nicotine vapor former where the mixture is in a ratio that ranges between about 60:40 and 40:60 by weight. Other combinations, amounts or ranges may be used.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A method of making a non-nicotine e-vaping section, comprising:

first defining a reservoir in a housing, the reservoir configured to contain a non-nicotine pre-vapor formulation, the non-nicotine pre-vapor formulation being devoid of nicotine and including at least one non-nicotine compound;

positioning a heater and a wick in a chamber, the heater being in heating proximity to the wick;

second defining at least one first channel, the at least one first channel being configured to communicate the non-nicotine pre-vapor formulation from the reservoir to the wick; and third defining at least one first air passage, the at least one first air passage being configured to allow a first airflow to enter the reservoir, the first airflow including a vapor from the heater that at least partially vaporizes the non-nicotine pre-vapor formulation during an operational use of the non-nicotine e-vaping section.

2. The method of claim 1, wherein the second defining and the third defining defines the at least one first channel and the at least one first air passage to be parallel to each other.

3. The method of claim 1, wherein the second defining and the third defining defines a first total cross-sectional flow area of the at least one first channel to be larger than a second total cross-sectional flow area of the at least one first air passage.

4. The method of claim 1, wherein the second defining and the third defining defines a first total cross-sectional flow area of the at least one first channel to be between 0.75 $mm^2$ and 1.25 $mm^2$ and a second total cross-sectional flow area of the at least one first air passage to be between 0.1 $mm^2$ and 0.2 $mm^2$.

5. The method of claim 1, wherein the second defining and the third defining defines a ratio of a first total cross-sectional flow area of the at least one first channel to a second total cross-sectional flow area of the at least one first air passage to be between 9:1 and 5:1.

6. The method of claim 1, wherein the third defining defines a cross-sectional flow area of each one of the at least one first air passage to be no larger than 0.12 $mm^2$.

7. The method of claim 1, wherein the positioning positions the wick to not extend into the at least one first channel and not extend into the reservoir.

8. The method of claim 1, wherein the second defining defines the at least one first channel to includes two or more channels.

9. The method of claim 1, further comprising:

fourth defining at least one first air vent within the non-nicotine e-vaping section, the at least one first air vent being configured to allow a second airflow to enter the chamber.

10. The method of claim 9, wherein the fourth defining defines the at least one first air vent so that a discharge end of the at least one first air vent is positioned to directly face the heater.

11. The method of claim 9, wherein the fourth defining defines the at least one first air vent to allow the second airflow to enter the chamber in a first direction.

12. The method of claim 11, further comprising:

configuring the chamber to allow the second airflow in the first direction to turn and flow at least partially across and away from the heater in a second direction, the first direction and the second direction being about perpendicular to each other.

13. The method of claim 11, wherein the positioning positions at least one first flat heating surface of the heater to be perpendicular to the first direction.

14. The method of claim 9, further comprising:

fifth defining at least one first air inlet within the housing, the at least one first air inlet being in fluid communication with the at least one first air vent when the non-nicotine e-vaping section is connected to a power section to form a non-nicotine e-vaping device.

15. The method of claim 1, wherein the positioning positions the wick to be connected to an outer surface of a first wall of the reservoir, the wick covering a discharge end of the at least one first channel, the at least one first air passage including an inlet end that is positioned on the outer surface and adjacent to the wick.

16. The method of claim 1, wherein the positioning positions the wick to be connected to a wall of the chamber, and the heater overlays and directly contacts at least a portion of the wick, the heater including at least one first flat heating surface that faces an interior of the chamber, the at least one first flat heating surface including openings that expose surface regions of the wick to the interior of the chamber.

17. The method of claim 1, wherein the positioning positions a flat major surface of the wick to face an interior of the chamber, the wick being a pad.

18. The method of claim 1, further comprising:

filling the reservoir with the non-nicotine pre-vapor formulation, the non-nicotine pre-vapor formulation including a non-nicotine vapor former and the at least one non-nicotine compound.

19. The method of claim 18, wherein the at least one non-nicotine compound is cannabis, at least one cannabis-derived constituent, or both cannabis and the at least one cannabis-derived constituent.

20. The method of claim 1, wherein the second defining and the third defining defines the at least one first channel and the at least one first air passage to be at least partially defined within a first wall of the reservoir.

21. A method of making a non-nicotine e-vaping device, comprising:

performing the method of claim 1; and connecting a power section to the non-nicotine e-vaping section, the power section including a power source, and control circuitry, the control circuitry being configured to selectively send an electrical current from the power source to the heater.

22. The method of claim 2, wherein the second defining and the third defining respectively defines the at least one first channel and the at least one first air passage to transport the non-nicotine pre-vapor formulation and the first airflow and in opposing directions.

23. The method of claim 2, wherein the second defining and the third defining respectively defines the at least one first channel and the at least one first air passage to transport the non-nicotine pre-vapor formulation and the first airflow and in opposing directions that pass by each other.

24. The method of claim 15, wherein the positioning positions the wick to be on the outer surface that is a planar surface.

25. A method of making a non-nicotine e-vaping section, comprising:

first defining a reservoir in a housing, the reservoir configured to contain a non-nicotine pre-vapor formulation, the non-nicotine pre-vapor formulation being devoid of nicotine and including at least one non-nicotine compound;

positioning a heater and a wick in a chamber, the heater being in heating proximity to the wick;

second defining at least one first channel, the at least one first channel being configured to communicate the non-nicotine pre-vapor formulation from the reservoir to the wick; and third defining at least one first air passage, the at least one first air passage being configured to allow air to enter the reservoir, the at least one first channel and the at least one first air passage being configured to transport the non-nicotine pre-vapor formulation and the air and in opposing directions that pass by each other.

* * * * *